United States Patent [19]

Hoefelmayr

[11] Patent Number: 4,558,843

[45] Date of Patent: Dec. 17, 1985

[54] AIR INLET VALVE FOR ADMITTING AIR TO THE MILK DRAIN CONDUIT OF A TEAT CUP OR COLLECTOR PIECE

[75] Inventor: Tilman Hoefelmayr, Niederteufen, Switzerland

[73] Assignee: Biomelktechnik Hoefelmayr & Co., Niederteufen, Switzerland

[21] Appl. No.: 628,189

[22] Filed: Jul. 6, 1984

[30] Foreign Application Priority Data

Jul. 19, 1983 [EP] European Pat. Off. ........ 83107075.0

[51] Int. Cl.[4] ............................................ F16K 31/145
[52] U.S. Cl. ..................................... 251/61; 251/357; 119/14.36; 137/103; 137/907; 92/98 R
[58] Field of Search ............... 119/14.41, 14.36, 14.38; 137/103, DIG. 8; 251/61, 61.2, 61.5, 357, DIG. 5, 333, 331; 92/98 R, 99, 100

[56] References Cited

U.S. PATENT DOCUMENTS

| 2,273,679 | 2/1942 | Westberg | 251/61 |
| 3,085,780 | 4/1963 | Yale | 251/61.5 |
| 4,173,946 | 9/1978 | Maier et al. | 119/14.36 |
| 4,198,028 | 9/1978 | Cook | 251/61.2 |

FOREIGN PATENT DOCUMENTS

| 1274847 | 3/1969 | Fed. Rep. of Germany. |
| 1299165 | 3/1970 | Fed. Rep. of Germany. |
| 1632935 | 8/1971 | Fed. Rep. of Germany. |
| 2046276 | 3/1972 | Fed. Rep. of Germany ... 119/14.38 |
| 8015963 | 3/1982 | Fed. Rep. of Germany. |

Primary Examiner—Samuel Scott
Assistant Examiner—Noah Kamen
Attorney, Agent, or Firm—Flynn, Thiel, Boutell & Tanis

[57] ABSTRACT

An air inlet valve for admitting air to the milk drain conduit of a milking cup or collector piece includes a housing secured to the milking cup or collector piece, a diaphragm clamped within the housing, and a valve poppet secured to the diaphragm so as to project from one side thereof. The valve poppet cooperates with a valve seat to form a valve adapted to periodically open and close in response to a pulsator pressure action on the other side of the diaphragm. In its opened state, the valve permits atmospheric air to flow through a connecting conduit to the milk drain conduit such as the interior of a rubber teat cup. The connecting conduit opens through the valve seat surface. The valve poppet can be releasably secured to the diaphragm.

20 Claims, 3 Drawing Figures

AIR INLET VALVE FOR ADMITTING AIR TO THE MILK DRAIN CONDUIT OF A TEAT CUP OR COLLECTOR PIECE

FIELD OF THE INVENTION

The present invention relates to an air inlet valve for admitting air to the milk drain conduit of a milking cup or collector piece, and more specifically to an air inlet valve which includes a housing secured to the milking cup or collector piece, a diaphram clamped within the housing, a valve poppet secured to the diaphragm so as to project from one side thereof, and a valve seat cooperating with said valve poppet to form a valve which is adapted to periodically open and close in response to a pulsator pressure acting on the other side of said diaphragm and, in its opened state, admits atmospheric air through a connecting conduit to the milk drain conduit, in particular the interior of a rubber teat cup.

BACKGROUND OF THE INVENTION

An air inlet valve of the type defined above is generally known in the trade and has been found to operate in a highly satisfactory manner. The air inlet valve itself is of relatively small size, and has a diaphragm diameter of about 5 mm. Its individual parts are permanently secured to one another.

Already known from German Patent No. 1 299 165 is an air inlet valve for a milking cup in which the valve itself is secured to a head portion of the rubber teat cup so as to periodically admit air under atmospheric pressure to the head portion of the rubber teat cup. A valve chamber communicates with the atmosphere through a first passage, with a pulsator through a second passage and with the head cavity of the rubber teat cup through a third passage, and contains a valve body in the form, for instance, of a ball or a cylinder. During operation of a valve of this type, as a vacuum is generated in the pulsator passage, the valve body is aspirated against the action of gravity toward the outlet end of the pulsator passage and simultaneously obstructs the latter passage and the third passage which communicates with the head cavity of the rubber teat cup. As the vacuum subsequently disappears, the valve body finally drops down under the force of gravity, whereby the passage leading to the head cavity of the teat cup is opened, permitting atmospheric air to enter the teat cup through this passage from the exterior of the valve. Due to the inertia of the valve body, valves of this type operate relatively sluggishly and without properly defined opening and closing times. In addition, the atmospheric air admitted to the head portion of the rubber teat cup is not readily capable of promoting the draining of the milk body located below the teat because the teat, at least in its tightly full state, completely closes the suction nozzle of the teat cup so as to at least strongly retard the passage of air therethrough.

Known from German Offenlegungsschrift No. 16 32 935 is an air inlet valve which includes a valve member in the form of a diaphragm having one side exposed to atmospheric air while the other side communicates with the pulsator cavity of a milking cup via a passage opening through the valve seat surface. In addition, the side of the diaphragm facing toward the pulsator cavity communicates with the interior of the head cavity of a rubber teat cup via a further connecting passage. As soon as a vacuum is created within the pulsator cavity, the communication between the pulsator cavity and the interior of the head cavity of the teat cup is interrupted. As the pressure within the pulsator cavity subsequently rises to atmospheric pressure, the diaphragm is lifted from the valve seat, permitting air under atmospheric pressure to enter the head cavity of the rubber teat cup from the pulsator cavity through the connecting passage. Valves of this type suffer from substantially the same disadvantages as the valves already discussed.

German Offenlegungsschrift No. 20 46 276 discloses a further diaphragm air inlet valve, in which the region on one side of the diaphragm communicates with the pulsator cavity of a milking cup, while the region on the other side of the diaphragm carries a valve poppet which, in response to the position of the diaphragm, can permit and obstruct the entry of atmospheric air from the exterior of the milking cup via a passage communicating with the head cavity of the rubber teat cup.

Known from U.S. Pat. No. 3,255,732 is an air inlet valve in which an air inlet passage communicates directly via the milking cup with the suction nozzle of the rubber teat cup at a location below the teat. The air inlet passage is adapted to be selectively closed and opened to the atmosphere by a diaphragm valve controlled in response to the pulsator pressure. This control is carried out in such a manner that the presence of a vacuum in the pulsator results in atmospheric air being admitted to the suction nozzle of the rubber teat cup, while the presence of atmospheric pressure in the pulsator results in the connecting passage being closed so as to obstruct the flow of atmospheric air to the suction nozzle of the rubber teat cup. As a result, atmospheric air is always admitted to the suction nozzle of the rubber teat cup at the beginning of and during the suction cycle.

German Patent No. 1 274 847 discloses an air inlet valve in which the lower end of the milking cup is provided with a clamping member for clamping the lower end of the suction nozzle of the rubber teat cup, which is in the form of a gabled roof surface. The oblique and downwardly extending opposite faces of the gabled portion are formed with openings which communicate with the milk drain conduit. These openings are closed by the rubber teat cup when the latter is in its collapsed state, namely when the pressure within the pulsator passage is somewhat higher than that in the milk drain conduit. In this state, however, the collapsed rubber teat cup uncovers openings which are formed in the lateral end walls of the clamping member and communicate with the exterior, namely with air under atmospheric pressure. As a result, atmospheric air is admitted in this state to the suction nozzle below the teat. During the suction cycle, when the pulsator pressure substantially equals the milking vacuum, the rubber teat cup returns to its substantially tubular state, resulting in the milk drain passages of the clamping member being uncovered and the openings which communicate with the exterior being closed. A valve of this type suffers from the disadvantage, however, that its control is fully dependent on movements of the rubber teat cup. As a result, the control times may vary widely in response to the flow of milk. For example, in the case of a reduced milk flow, the control timing will be more extended, while in the case of increased milk flow, the control timing intervals will be shorter. In addition, a valve of this type does not operate abruptly, which is an essential prerequisite for optimizing the milking cycle, but opens and closes rather slowly. Further undesirable variations of the control timing are caused by aging of the rubber and the resultant loss of its elasticity.

A modified valve of the type discussed above has become known from German Gebrauchmuster No. 80 15 963.3. In contrast to the valve discussed above, this valve periodically opens and closes only the openings communicating with the exterior of the milking cup, that is with atmospheric air, while the space below the teat remains in constant communication with the milk drain conduit, so that the milk is continuously drained. In addition to the disadvantages set forth above, valves of this type suffer from the further disadvantage that milk may enter the air inlet passage, resulting in the danger that residual amounts of milk may remain in the passage, particularly towards the end of the milking operation. As these passages are very small, the cleaning thereof is rather difficult, and it frequently happens that milk coagulates in the air inlet passage without being noticed. If the entry of air is obstructed or reduced, the vacuum adjacent the tip of the teat tends to fluctuate in a completely uncontrolled and biotechnically undesirable manner, as will be discussed below with reference to FIG. 1 of the drawings. Thus, there exists an increased demand for a valve which is adapted to be readily cleaned or which can operate in such a manner that, if possible, the formation of residual milk deposits in the valve is prevented from occurring at all. A valve of this type would on the one hand ensure reliable operation under all practical conditions, and would on the other hand meet the strict cleanliness requirements which exist in the field of food processing.

SUMMARY OF THE INVENTION

In a valve of the type defined in the introduction, in a preferred embodiment of which the connecting conduit opens as a drip nose into a viewing glass component located below the milking cup, it was for a long time a matter of speculation as to how it were possible that milk residue deposits were able to form in the upwardly extending connecting conduit and possibly even in the more highly positioned valve communicating therewith. Initially it was assumed that this phenomenon might be brought about by circumstances in which the end of the connecting conduit formed with a drip nose was not properly installed so as to be precisely perpendicular to the milk flow, but was instead positioned at a small angle to the direction of the milk flow, so that milk would be forced into the connection conduit by kinetic energy. To counter this effect, a valve was designed with the end of the connecting conduit which projects into the milk flow being cut at an angle and with the thus formed beveled surface being located downstream of the milk flow. This design did not, however, result in any improvement.

A further assumption as to the cause of the contamination of the valve with milk was based on the following phenomenon: at the end of the pressure relief phase, as the valve closes against the spring force at a pressure of about 10 kPa due to the creation of a vacuum in the pulsator cavity, the further increase of the vacuum in the pulsator cavity up to a value of about 45 kPa causes the elastic rubber diaphragm to bulge toward the pulsator cavity, with the result that the volume of the space between the already closed valve poppet and the diaphragm increases in size and exerts a suction effect. To eliminate this suction effect, extensive experiments were carried out with diaphragm materials of varying elasticity and with stiffening disks provided against the side of the diaphragm facing toward the pulsator cavity. None of these experiments led to any appreciable results, however, with regard to curing the milk aspiration phenomenon.

With the aid of high-speed cinematography, carried out with a transparent teat cup for the quite different purpose of investigating the so-called backflow or backspray phenomenon adjacent the tip of the teat, it was discovered for the first time that at the end of the suction phase, the milk tends to shoot into the connecting conduit leading to the valve, and frequently is carried into the valve itself, and then flows back therefrom after an interval of only about 5—15 milliseconds. The rapid backflow of the milk through the connecting conduit is obviously caused by the opening of the valve at the beginning of the pressure relief phase and the resultant entry of air. By adjusting the air inlet valve to have an earlier opening time, it was possible to achieve a noticeable reduction in the flow of the milk into the connecting conduit, a particularly early opening of the air inlet valve even resulting in the flow being wholly avoided. On the other hand, however, a long open period for the valve, and particularly an early opening time, results in an unacceptable impairment of the function of the entire periodic air inlet system. The vacuotechnical and biotechnical optimum, which is very sharply defined, lies in the range of a later opening time. For this reason, an adjustment of the valve to an earlier opening time was not conducive to a satisfactory solution of the problem under discussion.

There remains the problem as to how the backflow of the milk into the air inlet valve might be explained. In a milking apparatus with periodic admission of air, if the four air inlet valves are locked in their closed state, the milking vacuum adjacent the tip of the teat develops substantially as shown in FIG. 1 of the accompanying drawings, such milking vacuum being represented in this figure in synchronized relationship to the development of the vacuum in the pulsator cavity. Of interest for an explanation of the flow of milk into the air inlet conduit is the configuration of the two curves corresponding to the tip of the teat and the pulsator cavity in the cross-hatched areas G and G'. At the end of the suction phase B, the rated vacuum (in this case $0.5 \times 10^5$ Pa) prevails in the pulsator cavity, with substantially the same vacuum prevailing at the tip of the teat. Under these conditions, there is no significant pressure difference acting on the wall of the rubber teat cup, so that the latter remains in its expanded state due to its elasticity. The vacuum below the tip of the teat propagates through the connecting conduit into the air inlet valve itself. At the beginning of the relief phase C, the rapid disappearance of the vacuum in the pulsator cavity causes the rubber teat cup to collapse and to thus compress the teat milk channel, so that the flow of milk is stopped. The collapse of the rubber teat cup also causes the space below the tip of the teat to decrease in size. Due to its inherent inertia, however, the milk contained in the various passages of the milking apparatus is unable to follow this pumping effect sufficiently fast by flowing off at an increased rate. This results in a temporary pressure rise or vacuum loss below the tip of the teat and in the connecting conduit. With respect to the air connection conduit, this means that the high vacuum (about $0.5 \times 10^5$ Pa) of the suction phase B still prevails in the valve and the adjacent end of the conduit, while a vacuum of only about $0.15 \times 10^5$ Pa prevails at the drip nose end portion of the connection conduit. If at this time there is any milk in the vicinity of the drip nose, it will be aspirated in the direction of the higher vacuum, namely toward the valve. The force of this suction effect depends on the pressure differential and on the volume of the "vacuum source", that is, on the volume of the interior of the valve with the valve poppet closed. Elimination of the inflow effect thus requires that the volume of the "vacuum source" be reduced to a minimum or be, if possible, completely reduced to zero.

The requirement that the valve volume be made as small as possible is opposed, however, by other important considerations. For example, there is always the danger of cow's hairs entering the valve. In order to retain the operability of the valve even in this situation, the interior of the valve must be of a sufficient size. It is further to be taken into account that the entire milking apparatus is normally cleaned by passing a cleaning liquid therethrough. Under this aspect, it is disadvantageous to include small spaces in the flow path, because the cleaning process is better suited for cleaning large cavities or spaces. Finally, extensive experiments under laboratory conditions and short- and long-term investigations carried out on a great number of animals of all species have clearly shown that the air inlet valve should open toward the end of the venting phase and close again at the beginning of the evacuation phase. In a poppet valve, the implementation of this actuation timing depends primarily on the effective diaphragm area, on the biasing force and, with regard to the opening time, on the relationship between the effective diaphragm area and the valve poppet area. If this relationship is selected to be 1:1, the opening vacuum and the closing vacuum are equal irrespective of any vacuum developed in the valve during the closed phase between the valve poppet and the diaphragm. The smaller the valve poppet diameter in relation to the effective diameter of the diaphragm, the earlier the opening time of the valve, while the size of the valve poppet does not have any effect on the closing of the valve. If the valve poppet were very small, and if the vacuum in the connecting conduit leading to the air inlet valve were practically equal to the vacuum in the pulsator cavity, the spring acting on the diaphragm would open the valve, because the closing pressure acting on the valve poppet would be substantially less. This could lead to a situation in which the valve opens by itself at the instant at which it closes. By properly selecting the valve poppet diameter in relation to the force of the compression spring and the effective diaphragm area, it is possible to accurately adjust the opening time independently of the closing time. From all these considerations it appears evident that the valve poppet has to be of relatively large size. This implies, however, that the requisite sealing between the valve poppet and the valve seat is difficult to achieve due to the large sealing area and correspondingly low engagement pressure per unit area, particularly in view of the ever present danger of contamination. Under these conditions, the parts of the valve would have to be finished with a high accuracy for ensuring proper operability over an extended period of time. A valve of this type would therefore be very delicate in operation. Finally, there would be a relatively large space between the valve poppet and the diaphragm which would be capable of aspirating milk. It is this particular effect, however, which is supposed to be avoided.

In summary, it can be said that the milk may enter the air inlet valve primarily due to one of the following reasons:

1. If at the end of a milking operation the milking cup does not hang vertically downwardly, as is usually the case, but is at a more or less inclined position, residual milk flowing back from the collector piece or from the short milk hose may enter the air inlet conduit if the conduit is not provided with a drip nose.

2. The same may occur in the case of a very bad (but frequently encountered) milking practice in which, at the end of the mechanical milking operation, the residual milk is manually milked into the milking cup removed from the teat. This practice frequently leads to the formation of a kink in the milk hose between the milking cup and the collector piece. As a result, milk is retained in the milking cup, which is no longer subject to a vacuum, and escapes to the exterior through the air inlet conduit and the valve, whereby the air inlet system becomes contaminated unless it is immediately rinsed with water.

3. Finally, it is possible as discussed above that milk can be temporarily aspirated into the air inlet valve during the normal milking operation due to a vacuum present in the interior of the valve.

It is therefore an object of the present invention to provide an air inlet valve which is of the type defined in the introduction and which is capable of being kept clean in the simplest possible manner.

To attain this object in an air inlet valve of the type specified in the introduction, the invention provides as a first solution that the connecting conduit opens into the valve seat surface. In this manner, it is possible without regard to the size of the interior space between the valve poppet and the diaphragm to safely prevent milk spray from entering this space, because the valve poppet itself keeps the connecting conduit closed during the full closed phase of the air inlet valve. As the end of the connecting conduit is thus kept closed for the period during which a vacuum is generated in the pulsator cavity, no corresponding vacuum is generated in the interior of the valve during the same period, so that the pressure differential between the exterior of the valve (atmospheric pressure) and the interior of the valve is practically nonexistant. In this embodiment of the valve, the interior space thus cannot act as the vacuum source referred to above. With regard to the design of the valve poppet, it is only of importance to achieve a good sealing action between the valve poppet and the valve seat around the opening of the connecting conduit. The valve seat is therefore preferably designed in such a manner that the valve seat surface is solely formed by a sectional surface of the connecting conduit. The seating of the valve poppet on the outlet end of the connecting conduit in the closed state of the valve results in an additional closing force being exerted on the valve. As a result, the valve opens at a later time than it closes. The timing relation between the opening and closing of the valve may be varied by varying the contact area between the valve poppet and the end surface of the connecting conduit.

This particular design of the valve results in a number of particular advantages. As the valve poppet is preferably of conical shape, a cleaning liquid entering the air inlet valve from the connecting conduit will at first impinge on the lower surface of the cone and thereby be diverted downwardly in the direction of the diaphragm of the valve. This results in an improved cleaning of the diaphragm and of the interior of the valve. A further advantage is to be seen in the fact that, in the closed position of the valve, the valve poppet has to cover only a small hole. This results on the one hand in a high engagement pressure per unit area and, on the other hand, in a fast closing response of the valve. Since there is only a small opening to be sealed, engagement of the valve poppet with this opening results in the valve itself being sealingly closed. This enables the valve and the timing thereof to be even more accurately controlled. With regard to the service life of the valve, it is also of importance that the valve poppet formed as a valve cone has to seal against only a relatively small area. As the valve poppet itself is rotatable, and will usually be rotated on disassembly and reassembly of the valve, the opening to be closed will always be covered by a new surface portion of the valve poppet. As a result, a punching effect in the valve seat is avoided, even if a soft rubber is employed for the valve poppet. The use of a soft rubber material is in itself of considerable importance for the sealing properties of the valve.

According to another solution to the problem posing itself, the invention provides that the valve poppet is releasably secured to the diaphragm. This permits the valve poppet to be readily dismounted, so that the diaphragm and the space between the valve poppet and the diaphragm are readily accessible for particularly effective cleaning. In an embodiment found to be particuarly advantageous, the valve poppet is releasably retained by a snap engagement retaining arrangement secured to the diaphragm.

In a preferred embodiment, the snap engagement retaining arrangement extends through the diaphragm and is formed with a through opening, and a plunger connected to the valve poppet extends through the snap engagement retaining arrangement so as to project beyond the side of the diaphragm facing toward the pulsator cavity. In this case, the valve poppet may be readily dismounted by separating the complete valve with its housing from its connection to the milking cup or collector piece, whereupon the valve poppet is ejected by exerting pressure on the plunger from the side of the diaphragm facing toward the pulsator cavity.

In a particularly simple design of the snap engagement retainer arrangement, the plunger is formed with an annular recess adapted in the assembled state to be engaged by an annular projection on the interior surface of the through-opening.

In order to facilitate the snap engagement and disengagement, the tubular portion of the snap engagement retaining arrangement, which projects towards the pulsator cavity, is preferably formed with one or more axially extending slots to increase its resiliency.

The valve poppet is preferably made of a material, for instance rubber, different from that of the plunger, so as to improve its sealing properties, and it may advantageously be formed as a frustoconical member, with the plunger in the form of a bolt which extends axially therethrough.

The accessibility of the space between the valve poppet and the diaphragm is still further improved by the fact that the valve seat surface is formed by the sectional surface of the connecting conduit.

The diaphragm is preferably retained in the housing by being clamped along its outer edge. This clamping retention is facilitated by providing an annular bead along the outer edge of the diaphragm, so that the diaphragm may be releasably secured by clamping the annular bead.

In this case, a particularly simple retention of the diaphragm is achieved by forming in the housing a first annular groove, and by forming in a retainer member releasably secured in the housing a second annular groove. Optimum sealing of the diaphragm and the possibility of readily cleaning the parts retaining the diaphragm may be achieved by forming the first and second annular grooves as V-shaped grooves. In this manner, it is possible to always achieve optimum positioning of the diaphragm without any constraint.

In a particularly advantageous embodiment, the retainer member includes a retainer head releasably secured to the housing by a bayonet coupling and providing fluid access to the diaphragm, and an annular member supported on the retainer head for rotation about the axis of the bayonet coupling and having therein the second annular groove.

In order to prevent any shear forces from acting on the diaphragm when installing the retainer head, the annular member is non-rotatably held in the housing, but can move longitudinally along the axis of rotation of the bayonet coupling.

In order to enable the operator to disassemble the air inlet valve, for example for cleaning purposes, and to effect the disassembly in a simple manner, for instance with the aid of a coin, a further feature of the invention provides that the side of the retainer head facing away from the diaphragm has a diametrically extending slot adapted to be engaged by a flat metal object for facilitating rotation of the retainer head.

For permitting the valve to be completely disassembled with a minimum of manual operations, the retainer head is preferably formed with a central opening into which the plunger connected to the valve poppet projects to such a degree that the insertion of the flat metal object into the slot of the retainer head causes the plunger and valve poppet to be released from the snap engagement retaining arrangement. In this manner, it is possible to release the valve poppet from the snap engagement retainer arrangement by the insertion for instance of a coin into the slot of the retainer head, and subsequent rotation of the coin immediately resulting in the diaphragm being released from its retained state. During this operation, the spring continues to be retained either by the diaphragm or by the lower housing portion.

BRIEF DESCRIPTION OF THE DRAWINGS

The invention will now be explained in detail with reference to an embodiment shown by way of example in the accompanying drawings, wherein.

DETAILED DESCRIPTION

Figure 1:
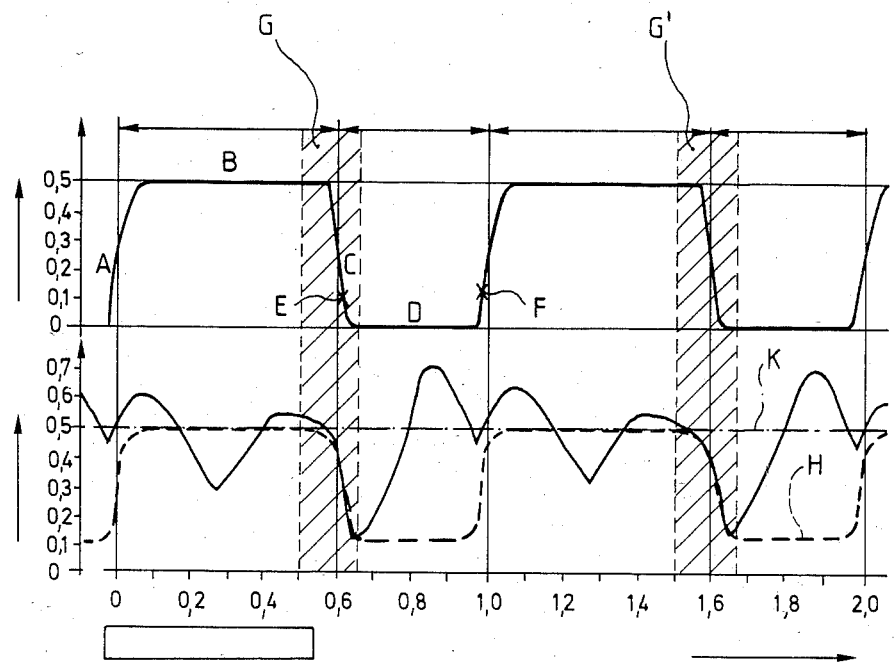
FIG. 1 is a graph showing the vacuum development in the pulsator cavity and adjacent the tip of the teat during two pulse cycles (2 seconds). The lower curve drawn in solid lines represents the case in which no air is admitted to the milking apparatus and the vacuum in the milk collecting receptacle or the milking conduits is kept constant. The curve drawn in phantom lines represents the vacuum development resulting from the use of an air inlet valve controlled in an optimum manner.

FIG. 1, as mentioned above, is a graph showing two curves, one above the other, representing in bar the development of the vacuum in relation to time (in seconds). The upper curve represents the development of the vacuum in the pulsator cavity. The operating cycle is shown to include four different phases, namely an evacuation phase A, a vacuum phase B, a venting phase C and a pressure phase D. Phases A and B together constitute the suction phase, while phases C and D together constitute the relief phase. Shown in solid lines in the lower part of FIG. 1 is the development of the milking vacuum adjacent the tip of the teat. The erratic and biotechnically very undesirable cyclical fluctuations of the vacuum adjacent the top of the teat are caused by the uncontrolled reciprocal pendulum-like flow of a body of milk in the milking conduits as a result of the pumping action of the rubber teat cup, and the resultant alternating action of kinetic energy and potential energy. The dotted line K represents the constant vacuum maintained in the collecting bucket for draining the milk from the milking cups. Finally, the dotted line H shows the controlled and biotechnically desirable development of the milking vacuum adjacent the tip of the teat brought about by use of an air inlet valve controlled in an optimum manner. The points E and F on the upper curve indicate the times at which the air inlet valve is opened and closed, respectively. These points are respectively situated immediately before and after respective points at which atmospheric pressure is attained and abandoned. At the same time, it is indicated that the air inlet valve preferably opens and closes at a somewhat lower vacuum. The more accurately it is possible to determine the location of the points at which the air inlet valve opens and closes, and the more abrupt this opening and closing operation is carried out, the more accurately it is possible to approach the dotted curve in the lower part of FIG. 1 this curve representing the ideal development of the milking vacuum adjacent the tip of the teat through use of an air inlet valve.

Figure 2:
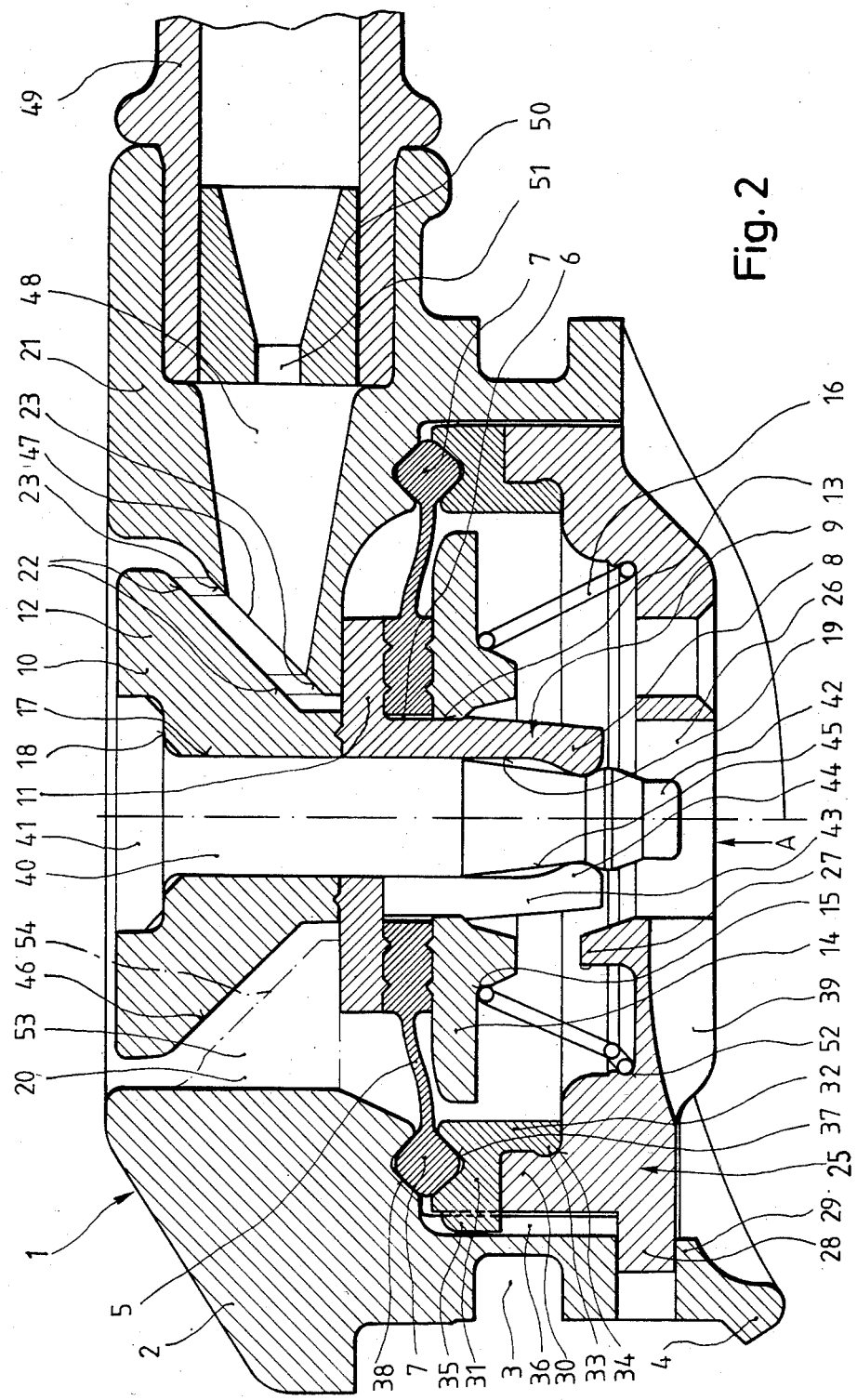
FIG. 2 is an axial sectional view of an air inlet valve according to the invention, in which the sectional plane in the left-hand half of the Figure extends substantially perpendicular to the sectional plane in the right-hand half thereof.

FIG. 2 shows an air inlet valve 1 which includes a housing 2. Housing 2 is adapted to be inserted into a suitably shaped opening formed in the sidewall of a milking cup shell in the direction of arrow A. On such insertion of housing 2, an O-ring seal (not shown in FIG. 2) in a groove 3 is brought into contact with the outer surface of a valve mounting member, in the present case the milking cup shell, while a nose 4 enters the opening of the milking cup shell for engagement with the interior wall surface thereof so as to fixedly retain the housing on the milking cup shell.

Disposed within housing 2 is a diaphragm 5 having a central opening 6 and provided with an annular bead 7 of square cross-sectional shape along its outer edge. Annular bead 7 may of course have other cross-sectional shapes, for instance a circular shape. A hub-shaped member 8 of a snap engagement retaining member 9 for a valve poppet 10 extends through the central opening 6 in the diaphragm 5. One end of the hub-shaped portion 8 has an annular flange 11. The outer surface of the hub-shaped portion 8 has a shallow annular groove 13 extending up to the annular flange 11. For securing the diaphragm 5 to the snap engagement retaining member 9, central opening 6 of the diaphragm 5 is pushed over the hub-shaped portion 8 and into engagement with the annular flange 11, and is secured in this position by an annular plate member 14 which is pushed onto the hub-shaped portion 8 until it is lockingly seated in annual groove 13. In this manner, the diaphragm 5 is securely retained between the annular flange 11 and the annular plate member 14, so that the central opening 6 in diaphragm 5 is sealed in a gas-tight manner after insertion of a plunger (described below) into the snap engagement retainer member.

The side of the annular plate member 14 facing away from the diaphragm 5 has an annular projection or seat 15 for centering a coiled spring 16 (described below).

A valve poppet is formed as a substantially frustoconical member 12, made for instance of rubber or the like for improved sealing properties. Frustoconical valve poppet member 12 has an axially extending center bore 17 and a coaxial counterbore 18 of larger diameter. Inserted through bores 17 and 18 and through a further coaxial bore 19 extending through the hub-shaped portion 8 is a plunger in the shape of a bolt and generally designated 40. A head portion 41 of the plunger bolt 40 is received in the counterbore 18 in valve poppet 10. The end 42 of plunger 40 projects towards the pulsator cavity and beyond the hub-shaped portion 8. The hub-shaped portion 8 has one or more slots extending in the axial direction to points closely adjacent the annular flange 11, only one of these slots being indicated at 43. The slots 43 serve to divide the hub-shaped portion 8 into a plurality of axially extending fingers for effecting improved flexibility of the snap engagement retainer member 9. The interior wall surface of the hub-shaped portion 8 is formed with an annular projection 44 which projects into the bore 19. In the assembled state of the valve, the projection 44 engages an annular recess 45 formed in the plunger 40.

In the drawing, the valve poppet 10 is shown in its upper position, in which a space 20 above the diaphragm 5 provides fluid communication between a lateral tubular portion 21 which opens into the space 20 and the atmosphere. In the lowered position of the valve poppet 10, an annular surface portion 22, the limits of which are indicated by four vertical lines in the cross-sectional view of the drawing, comes into contact with an annular valve seat 23 formed by a surface portion surrounding the outlet opening 47 of a connecting conduit 48 which communicates with the space 20, annular surface 22 being formed on the frustoconical outer wall 46 of the valve poppet 10. As valve poppet 10 is lowered from the position shown in FIG. 2, it is effective to merely interrupt communication of the connecting conduit 48 with the atmophere, while the space 20 within the valve remains at atmospheric pressure.

A hose or tube 49 having one of its ends inserted into the tubular portion 21 connects the connecting conduit 48 to a viewing glass tube or the like (not shown), the viewing glass tube being disposed for instance below the milking cup (not shown) and milk obtained from a respective teat being drained through the glass tube toward the milking bucket. For accurately adjusting the amount of air entering the milk drain conduit through the connecting conduit 48 during the opening phase of the valve 1, the hose or tube 49 is provided with a calibrated restriction 50. For limiting the flow rate of air through the narrowest portion 51 of restriction 50, the latter is designed in the form of a venturi nozzle. This nozzle should nevertheless be located as close as possible to valve 1, so that the flow rate of the air is reduced as much as possible before the air flow combines with the milk to be drained. This may be of importance with regard to the milk's content of free fatty acids and thus with regard to the overall quality of the milk.

The diaphragm 5 is secured by having its annular bead 7 clamped within the housing 2. Provided for this purpose is a retainer head 25 in the form of an annular dish-shaped member having a central opening 26. Formed around the opening 26 is a plurality of projections 27 directed inwardly toward the diaphragm 5, only one such projection being shown in the drawing. The outer surfaces of the projections 27 can serve to coaxially position the already mentioned coiled spring 16. In the embodiment shown in FIG. 2, however, the end of the substantially conical coiled spring 16 remote from diaphragm 5 is seated in an annular groove 52 formed in the bottom of the dish-shaped retainer head 25.

In the embodiment shown, the retainer head 25 is retained in the housing by a bayonet coupling structure. In particular, retainer head 25 has integrally formed thereon several radially outwardly projecting lugs 28, only one of which is shown in the drawing. In the locked position of retainer head 25, the lugs 28 each engage a projection 29 formed on the housing 2. The retainer head may, of course, also be formed with exterior threads engageable with interior screw threads formed in the housing.

Supported on a rim 30 on a side of the retainer head 25 facing the diaphragm 5 is an annular member 31 having an annular extension wall 32 projecting away from diaphragm 5, the extension wall 32 having a radially outwardly directed annular projection 33 engageable with a corresponding annular recess 34 formed in an interior wall surface of the retainer head 25. In this manner, the annular member 31 is rotatably supported on the upper rim 30 of the retainer head 25. The outer periphery of annular member 31 has at least one longitudinally extending, lug-shaped outward projection 35 which is slidably received in an axial slot 36 formed in the interior wall surface of the housing 2, so that the annular member 31 is prevented from rotating about its axis of symmetry but is axially displaceable within the housing 2.

Annular member 31 is further formed with a first annular key groove 37 of V-shaped cross-section which receives the annular bead 7 of the diaphragm 5. Facing this first annular key groove is a corresponding annular key groove 38 formed in the housing 2. The two key grooves 37 and 38 clamp the annular bead 7 of the diaphragm 5 therebetween.

For facilitating installation and removal of the retainer head 25, for instance with the aid of a coin, the side of the retainer head 25 facing away from the diaphragm 5 has a diametrically extending slot 39 which is shown only in the left-hand portion of FIG. 2, due to the 90° offset between the two sectional planes.

The end portion 42 of the plunger 40 projects into the region of the slot 39 to such a degree that a coin or the like inserted into the slot 39 exerts pressure on end portion 42 and shifts the plunger 40 upwardly so as to release the plunger from the snap engagement retaining member 9.

For cleaning purposes, the described air inlet valve may be diassembled in the follower manner. Proceeding from the assembled state of the valve shown in FIG. 2, sufficient pressure is exerted on the lower end portion 42 of the plunger 40 to release the plunger and thus the complete valve poppet 10 from engagement with the snap engagement retainer member 9. The plunger 40 may then be lifted out of the housing 2 together with the valve poppet 10. This provides access to the space 20 above the diaphragm 5 and to the interior of the connecting conduit 48 in the tubular portion 21, so that the valve components exposed to atmospheric air can be thoroughly cleaned.

If the air inlet valve is to be completely disassembled, the coin or the like inserted into the slot 39 is also used to rotate the retainer head 25 about its axis of symmetry so that the lugs 28 become disengaged from the projections 29. In this manner, the retainer head 25 is rotated relative to both the housing 2 and the annular member 31. The lug-shaped projections 35 prevent the annular member 31 itself from being rotated, so that the diaphragm 5 is not subjected to any shearing forces. As soon as the lugs 28 of the retainer head 25 are disengaged from the projections 29, the retainer head 25 and the annular member 31 may be withdrawn downwardly from housing 2, the lug-shaped projections 35 on the annular member 31 being guided in the slots 36. As a result of the described operation, the annular bead 7 of the diaphragm 5 is released from its clamped state, so that the diaphragm 5 may then be removed from the housing 2 together with the snap engagement retaining member 9 and the annular plate member 14 which secures the retaining member 9 to the diaphragm.

Reassembly of the thoroughly cleaned air inlet valve is accomplished by carrying out the above steps in reverse sequence.

In the preferred embodiment of the described valve, the restriction 50 is located as close as possible to the outlet opening 47 of the connecting conduit 48 so as to minimize the volume of the connecting conduit 48 between its outlet opening and the restriction.

For preventing the valve poppet from coming into contact with the valve seat surface only at a single angular location, which might result in an undesirable tilting of the valve poppet, the interior space 20 of the valve is preferably provided with one or two axially extending partitions 53, one of which is shown in FIG. 2 in dotted lines, each such partition being formed with a seat surface 54 for engagement with the surface 46 of the valve poppet 10.

Figure 3:
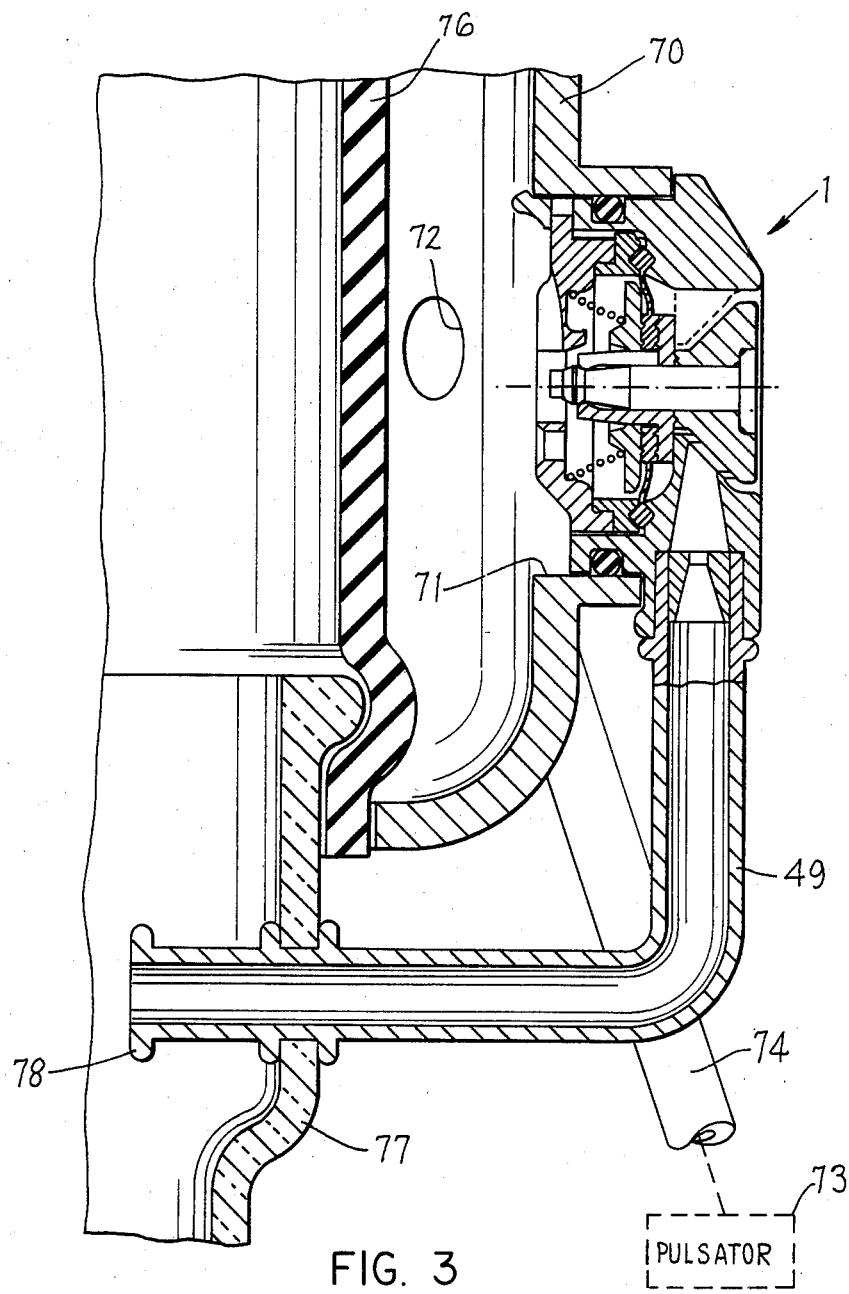
FIG. 3 is a fragmentary sectional view of a milking apparatus having the air inlet valve of FIG. 2 installed therein.

FIG. 3 shows the inventive air inlet valve 1 of FIG. 2 installed in a conventional milking apparatus of the tape disclosed in U.S. Pat. No. 4,173,946. The conventional milking apparatus includes a sleeve-like cup member 70 having in a side wall thereof openings 71 and 72, the valve 1 being releasably secured in the opening 71. A pulsator 73 communicates with the interior of the cup 70 through a conduit 74 and the opening 72. A rubber teat holder 76 is provided in the cup 70, and a milk discharge conduit 77 is coupled to the lower end of the cup 70 and communicates with the lower end of the teat holder 76. The connecting conduit 49 provides fluid communication between the valve 1 and the milk discharge conduit 77, the lower end of the connecting conduit 49 projecting radially inwardly to the center of the discharge conduit 77 and having at its end a drip nose 78.

The embodiments of the invention in which an exclusive property of privilege is claimed are defined as follows:

1. An air inlet valve for selectively supplying air to a milk discharge conduit of a milking device, comprising:

a housing adapted to be supported on the milking device, said housing having thereon an opening therein, having a surface which serves as a valve seat, and having a passageway therein which opens through said valve seat; a diaphragm which extends across said opening in said housing and has its peripheral edges sealingly clamped on said housing, said housing having means for providing fluid communication between a first portion of said opening on a first side of said diaphragm and atmospheric air surrounding said air inlet valve and having means for providing fluid communication between a second portion of said opening on a second side of said diaphragm and an interior region of the milking device; a valve poppet secured to said diaphragm so as to project from said first side thereof into said first portion of said opening in said housing, pressure decreases and increases in the interior region of the milking device causing said diaphragm to flex and to move said valve poppet between positions in which it is respectively engaging said valve seat so as to directly close and obstruct fluid flow through said passageway and spaced from said valve seat so as to permit fluid flow through said passageway; and a connecting conduit which provides direct fluid communication between the milk discharge conduit at a location downstream of a teat holder of said milking device and said passageway in said valve seat.

2. The valve according to claim 1, wherein said valve seat is an annular surface which encircles said passageway.

3. The valve according to claim 1, wherein said valve poppet is releasably secured to said diaphragm.

4. The valve according to claim 3, wherein said valve poppet is releasably secured to said diaphragm by snap engagement retainer means provided on said diaphragm.

5. The valve according to claim 4, wherein said snap engagement retainer means extends through said diaphragm and has an opening therethrough, and wherein a plunger connected to said valve poppet extends through said opening in said snap engagement retainer means and projects beyond said second side of said diaphragm into said second portion of said opening in said housing.

6. The valve according to claim 5, wherein said plunger has an annular recess which can be engaged by an annular projection on an inner surface of said opening through said snap engagement retainer means to releasably hold said plunger in such opening.

7. The valve according to claim 6, wherein said snap engagement retainer means has a hub portion which projects axially into said second portion of said opening in said housing and which has at least one axially extending slot for increasing its resiliency.

8. The valve according to claim 5, wherein said valve poppet is a substantially frustoconical member and said plunger is a bolt-like member extending axially through an opening provided in said valve poppet.

9. The valve according to claim 3, wherein said valve poppet is made of a rubber material.

10. The valve according to claim 3, wherein said valve seat is an annular surface which encircles said passageway.

11. The valve according to claim 1, wherein said housing includes clamping means for sealingly clamping said diaphragm along its outer peripheral edge.

12. The valve according to claim 11, wherein said diaphragm has as its outer peripheral edge an annular bead which is releasably clamped by said clamping means.

13. The valve according to claim 12, wherein said clamping means includes said housing having a first annular surface which has a first annular groove therein and includes an annular retainer member which is removably disposed in said second portion of said opening, has a second annular surface thereon which faces and is adjacent said first annular surface, and has a second annular groove in said second annular surface, said annular bead of said diaphragm being sealingly clamped in said first and second annular grooves.

14. The valve according to claim 13, wherein said first and second annular grooves are each approximately V-shaped in cross-section.

15. The valve according to claim 13, wherein said housing includes a housing part having said valve seat and said first annular surface thereon, and includes a retainer head and bayonet coupling means for releasably coupling said retainer head to said housing part, said retainer head holding said annular retainer member in the position in which said bead of said diaphragm is sealingly clamped in said first and second annular grooves, and said means providing fluid communication between the interior region of the milking device and said second portion of said opening in said housing including an opening through said retainer head.

16. The valve according to claim 15, including means for preventing rotation of said annular retainer member about an axis of rotation of said bayonet coupling means; said annular retainer member being movable within said opening in said housing axially of said axis of rotation when said retainer head is decoupled from said housing part.

17. The valve according to claim 15, wherein a side of said retainer head facing away from said diaphragm has a diametrically extending slot which can be engaged by a flat object for facilitating rotation of said retaining head relative to said housing part.

18. The valve according to claim 17, wherein said diaphragm has snap engagement retaining means secured thereon and extending therethrough, said snap engagement retaining means having an opening therethrough, wherein said valve poppet has an elongate plunger thereon which extends sealingly through said opening in and is releasably held by said snap engagement retaining means, and wherein said plunger projects into said opening through said retainer head to such a degree that insertion of a flat object into said slot in said retainer head causes such object to engage and axially move said plunger sufficiently to cause said snap engagement retaining means to release said plunger.

19. The valve according to claim 1, including resilient means for yieldably urging said valve poppet toward said position in which it is spaced from said valve seat on said housing.

20. The valve according to claim 19, wherein said resilient means includes a coil spring having one end supported on said housing and its other end supported on said diaphragm.

* * * * *